2,768,062
PROCESS AND APPARATUS FOR INCREASING THE SO₂ CONTENT OF CONVERTER GASES

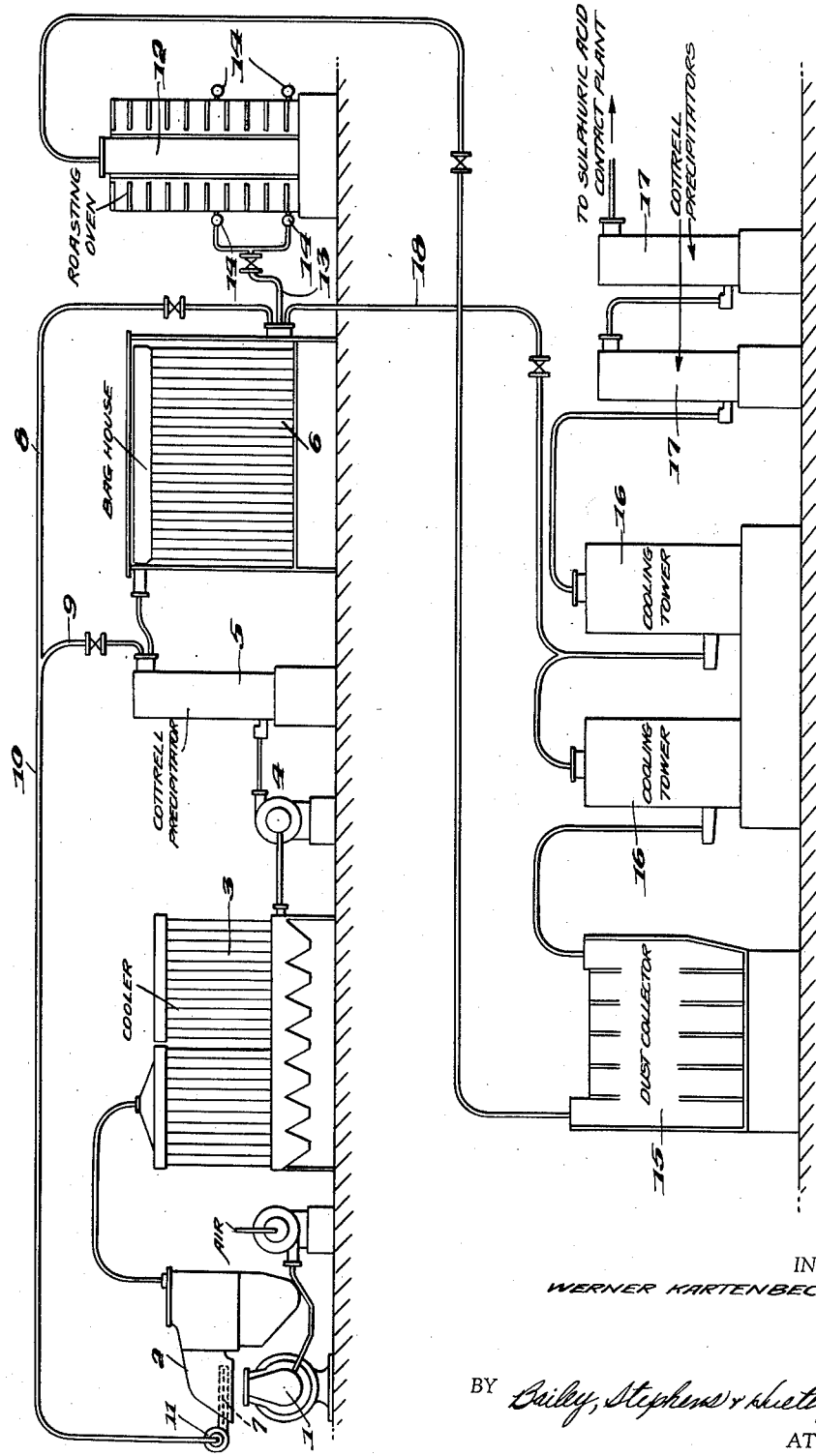

Werner Kartenbeck, Hamburg, Germany, assignor to Norddeutsche Affinerie, Hamburg, Germany Application October 17, 1952, Serial No. 315,327

3 Claims. (Cl. 23—177)

The present invention relates to a process for increasing the $SO_2$ content of converter gases such as are obtained in blowing sulfidic materials in converters such as, for example, in the blowing of copper matte.

In blowing sulfidic materials, such as, for example, copper matte, the concentration of the $SO_2$ contained in the converter gases depends to a great extent upon the quantity of false air which is drawn in between the converter mouth and the converter hood. The quantity of the air blast introduced into the converter depends upon the desired temperature which determines the rate of reaction in the converter. While it is desirable to keep the quantity of false air which is drawn into the converter hood as low as possible while still preventing escape of $SO_2$ containing gases into the atmosphere from between the converter mouth and hood in order to maintain as high an $SO_2$ content in the exhaust gases and thereby facilitate recovery thereof, this has not been found practical. The resulting higher temperature of the gases in the exhaust hood gives rise to the formation of certain quantities of $SO_3$ because of the catalytic effect of the oxidic materials, particularly those of iron which are formed on the surface of the hood by the spatters from the converter. The quantity of $SO_3$ formed increases with increases in temperature and it combines with the water contained in the air to form sulfuric acid which gives rise to difficulties in cleaning the gases, especially in the bag filters. In some instances, the incidence of sulfuric acid in the exhaust gases is such that all bag filters must be replaced after only 24 hours of operation.

The quantity of corrosive sulfuric acid reaching the purification apparatus also depends to some extent upon the type of sulfidic material which is blown in the converter. If such sulfidic material contains substantial quantities of lead or zinc, the oxides formed will neutralize the sulfuric acid to a certain extent in forming corresponding sulfates. However, such sulfate formation reduces the sulfur available in the exhaust gases by a corresponding amount. Even in such cases where neutralizing oxides are formed, care must be taken that the temperature of the gases within the hood are sufficiently low that all of the sulfuric acid formed is neutralized by the fly ash.

Of course when sulfidic materials are blown having a low content of metals capable of producing such a neutralizing effect such as usually the case with copper matte, the temperature of the exhaust gases in the hood must be kept relatively low.

While it has been suggested that lime be blown into the exhaust gases to bind the $SO_3$ which is formed, this procedure has not been entirely successful and the most practical way to repress the formation of $SO_3$ has been to draw in sufficient false air into the hood with the converter gases to have the desired cooling effect thereon. This, however, has the disadvantage that the $SO_2$ in the exhaust gases is substantially diluted and the recovery of sulfur values from such exhaust gases is hindered.

It is an object of the invention to provide a process and apparatus whereby exhaust gases from converters for sulfidic materials have a substantially greater $SO_2$ content while still repressing the formation of $SO_3$ in such exhaust gases.

It is a further object of the invention to lower the plant and plant operation costs for the purification and recovery of sulfur values in exhaust gases from converters.

In accordance with the invention it was found that the formation of $SO_3$ in the exhaust hood over the converter can be substantially repressed in a practical manner without undue dilution of the $SO_2$ in the exhaust gases by recycling a portion of the exhaust gases after cooling and introducing them into the hood. The introduction of the recycled gases into the hood should be in such a manner that it is distributed around the entire circumference of the hood so that it is uniformly mixed with the entering converter gases and false air. In operation, the access of false air to the hood is reduced to the minimum still permitting unhindered operation of the hood so that no $SO_2$ containing gases escape. It is possible, therefore, to obtain any desired cooling effect without undue dilution of the $SO_2$ containing exhaust gases.

The following comparison of the results which were obtained with a large copper converter illustrate the advantages obtained according to the invention.

In normal operation of the converter about 240 cubic meters of air per minute were blown into the bottom of the converter. In view of the oxygen taken up by the sulfidic material in the converter, only about 200 cubic meters of gas left the top of the converter per minute. With a hood temperature of 400° C. the quantity of the gases leaving the exit of the hood above the converter was about 550 cubic meters per minute, as about 350 cubic meters of false air were required to reduce the temperature of the gases leaving the converter to the hood temperature.

On the other hand, operating according to the invention, it was possible while maintaining the same hood temperature to lower the quantity of false air to about 100 cubic meters per minute by recycling about 250 cubic meters per minute of cooled exhaust gases back to the hood without causing the escape of gases from the hood entrance. Consequently, the $SO_2$ formed in the converter per minute is only distributed in 300 cubic meters of gas assuming a stationary equilibrium is reached, rather than 550 cubic meters, which means that the concentration of $SO_2$ in the exhaust gas is about 83% higher than when no recycling is employed.

Similarly, when operating at a hood temperature of 520° C., the quantity of gas leaving the hood was about 410 cubic meters per minute while 170 cubic meters per minute of recycled exhaust gas were introduced in the hood, which means that the $SO_2$ produced in the converter is distributed in 240 cubic meters rather than 410 cubic meters and provides about a 71% increase in concentration.

Consequently, the quantity of gas per unit of $SO_2$ content which is supplied to the plant for recovery of sulfur values therein is considerably less and, consequently, such recovery plant may be of smaller dimensions.

It was also found that a portion of the purification plant for the exhaust gases may be of smaller size, as it is not necessary that the recycled gas be as pure as is required for the gas supplied to the sulfur value recovery plant. In certain cases it was even found desirable that the recycled gas still contain some fly ash which exerts a neutralizing effect upon any $SO_3$ formed in the hood and, consequently, the recycling according to the invention has a twofold effect in reducing the $SO_3$ content in its cooling effect and the neutralizing action of the fly ash.

It was also found according to the invention that the

SO₂ content of the exhaust gases could be increased further by employing it instead of or together with the air for the sulfide ore roasting furnaces.

In the event that the roasting furnaces at hand are operating in such a manner that the effluent gases are too rich in SO₂ for further treatment as can be the case in the production of sulfuric acid therefrom by the contact process, it is preferable not to introduce the converter exhaust gases into the roasting furnace, but rather into the portion of the roasting gases purification plant in which the purity corresponds to that of the converter exhaust gases.

The accompanying drawing diagrammatically shows an apparatus for carrying out the process according to the invention.

Referring to the drawing, the SO₂ containing gases leaving converter 1 are drawn up into hood 2 and through cooler 3 by blower 4 and are then passed through Cottrell precipitator 5 and a baghouse 6. A portion of the gases is recycled to hood 2 and introduced and distributed therein through slots 7, either through lines 8 and 10 or lines 9 and 10 with the aid of blower 11. The portion of the SO₂ containing gases leaving baghouse 6 which are not recycled to hood 2, can be supplied to the roasting oven 12 through line 13 and annular distributing pipes 14. The gases enriched in SO₂ leaving the roasting oven are then successively passed through a dust collector 15, cooling towers 16 and Cottrell precipitators 17 and are then conveyed to a plant (not shown) for the recovery of the sulfur values contained therein, for example, a contact sulfuric acid plant. If the normal roasting oven gases are too rich in SO₂ for efficient recovery of sulfur values, as can be the case for the sulfuric acid contact process, the converter gases leaving baghouse 6 are preferably introduced into the roasting oven gases after they leave the roasting oven, for example, through line 18.

I claim:

1. In combination with apparatus for the conversion of molten sulfidic matte comprising a converter for said molten matte, a hood over said converter for drawing up gases leaving the converter said hood being spaced from said converter to provide access of atomspheric air between the converter and the hood to the interior of the hood, and a cooler for the gases leaving the hood, means for recycling a portion of the cool gases leaving the cooler to the hood and for intimately mixing the cool recycled gases with the gases drawn into the hood from the converter.

2. In a process for converting molten sulfidic matte by blowing air therethrough in a converter and in which hot SO₂ containing gases leaving said converter are drawn up through a hood with direct access of atmospheric air to the interior of the hood between the converter and the hood, and in which the SO₂ containing gases leaving said hood are cooled, the steps which comprise recycling a portion of said cooled SO₂ containing gases to said hood, intimately mixing such cool recycled SO₂ containing gases with the hot SO₂ containing gases leaving said converter and entering said hood to cool such gases leaving the converter and entering the hood and limiting the access of atmospheric air to such hood.

3. In a process for converting molten copper matte by blowing air therethrough in a converter and in which hot SO₂ containing gases leaving said converter are drawn up through a hood with direct access of atmospheric air to the interior of the hood between the converter and the hood, and in which the SO₂ containing gases leaving said hood are cooled, the steps which comprise recycling a portion of said cooled SO₂ containing gases to said hood, intimately mixing such cool recycled SO₂ containing gases with the hot SO₂ containing gases leaving said converter and entering said hood to cool such gases leaving the converter and entering the hood and limiting the access of atmospheric air to such hood.

References Cited in the file of this patent

UNITED STATES PATENTS

| | | |
|---|---|---|
| 1,344,905 | Laist | June 29, 1920 |
| 1,410,061 | Hinzke | Mar. 21, 1922 |
| 1,447,645 | Chase | Mar. 6, 1923 |
| 1,923,256 | Clark | Aug. 22, 1933 |
| 1,954,879 | Leverett | Apr. 17, 1934 |
| 2,195,980 | Bacon et al. | Apr. 2, 1940 |
| 2,249,193 | Titlesad | July 15, 1941 |